United States Patent
Beaurepaire

(10) Patent No.: US 9,646,084 B2
(45) Date of Patent: May 9, 2017

(54) CAUSATION OF STORAGE OF HANDSHAKE GREETING AUDIO INFORMATION

(71) Applicant: HERE Global B.V., LB Veldhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 173 days.

(21) Appl. No.: 14/170,001

(22) Filed: Jan. 31, 2014

(65) Prior Publication Data

US 2015/0220540 A1 Aug. 6, 2015

(51) Int. Cl.
*G06F 17/00* (2006.01)
*G06F 17/30* (2006.01)

(52) U.S. Cl.
CPC ................................ *G06F 17/3074* (2013.01)

(58) Field of Classification Search
CPC .. G06F 3/017; G06F 17/3074; G06K 9/00355
See application file for complete search history.

(56) References Cited

U.S. PATENT DOCUMENTS

| | | |
|---|---|---|
| 2002/0009972 A1 | 1/2002 | Amento et al. |
| 2003/0161097 A1* | 8/2003 | Le ............................ G06F 1/163 361/679.03 |
| 2008/0112598 A1 | 5/2008 | Gabara |
| 2009/0051648 A1* | 2/2009 | Shamaie ................ G06F 3/0346 345/156 |
| 2010/0178903 A1* | 7/2010 | Tofighbakhsh ... G06F 17/30867 455/414.3 |
| 2011/0118021 A1 | 5/2011 | Zalewski et al. |
| 2014/0198956 A1* | 7/2014 | Forutanpour ....... G06K 9/00295 382/115 |

FOREIGN PATENT DOCUMENTS

WO    WO2015094220 A1    6/2015

* cited by examiner

*Primary Examiner* — Joseph Saunders, Jr.
(74) *Attorney, Agent, or Firm* — Lempia Summerfield Katz LLC

(57) ABSTRACT

A method comprising determining that a user of the apparatus has performed an action that is consistent with at least part of a handshake greeting, receiving a stream of audio information from a microphone, determining handshake greeting audio information based, at least in part, on the audio information and the determination that the user of the apparatus has performed the action that is consistent with the handshake greeting, and causing storage of the handshake greeting audio information in a repository is disclosed.

20 Claims, 11 Drawing Sheets

CAUSATION OF STORAGE OF HANDSHAKE GREETING AUDIO INFORMATION

TECHNICAL FIELD

The present application relates generally to causation of storage of handshake greeting audio information.

BACKGROUND

As electronic apparatuses become increasingly prevalent and pervasive in our society, users of electronics apparatuses increasingly depend on their electronic apparatuses to assist the users in various aspects of the users' lives. Many users rely on their electronic apparatus for purposes relating to interpersonal interactions. For example, a user may maintain an address book on the user's electronic apparatus, may contact business connections via their electronic apparatus, and/or the like. As such, it may be desirable to configure an electronic apparatus such that the electronic apparatus facilitates various interpersonal interactions in a manner that is unobtrusive and intuitive.

SUMMARY

Various aspects of examples of the invention are set out in the claims.

One or more embodiments may provide an apparatus, a computer readable medium, a non-transitory computer readable medium, a computer program product, and a method for determining that a user of the apparatus has performed an action that is consistent with at least part of a handshake greeting, receiving a stream of audio information from a microphone, determining handshake greeting audio information based, at least in part, on the audio information and the determination that the user of the apparatus has performed the action that is consistent with the handshake greeting, and causing storage of the handshake greeting audio information in a repository.

One or more embodiments may provide an apparatus, a computer readable medium, a computer program product, and a non-transitory computer readable medium having means for determining that a user of the apparatus has performed an action that is consistent with at least part of a handshake greeting, means for receiving a stream of audio information from a microphone, means for determining handshake greeting audio information based, at least in part, on the audio information and the determination that the user of the apparatus has performed the action that is consistent with the handshake greeting, and means for causing storage of the handshake greeting audio information in a repository.

In at least one example embodiment, the microphone is comprised by the apparatus.

In at least one example embodiment, the microphone is a directional microphone.

In at least one example embodiment, the determination that the user of the apparatus has performed the action that is consistent with the handshake greeting comprises receipt of sensor information and determination that the sensor information is consistent with the user of the apparatus performing the handshake greeting.

In at least one example embodiment, the sensor information is visual information, and the determination that the sensor information is consistent with the user of the apparatus performing the handshake greeting comprises visual gesture recognition of the handshake greeting based, at least in part, on the visual information.

In at least one example embodiment, the sensor information is motion information, and the determination that the sensor information is consistent with the user of the apparatus performing the handshake greeting comprises motion gesture recognition of the handshake greeting based, at least in part, on the motion information.

In at least one example embodiment, the sensor information is hand position information, and the determination that the sensor information is consistent with the user of the apparatus performing the handshake greeting comprises hand position gesture recognition of the handshake greeting based, at least in part, on the hand position information.

In at least one example embodiment, the hand position information comprises information that indicates a hand position of the user.

In at least one example embodiment, the hand position information is received from a capacitive sensor.

In at least one example embodiment, the capacitive sensor is comprised by the apparatus.

In at least one example embodiment, the part of the handshake greeting is a preparative portion of the handshake greeting.

In at least one example embodiment, the part of the handshake greeting is a contact portion of the handshake greeting.

In at least one example embodiment, the part of the handshake greeting is a release portion of the handshake greeting.

In at least one example embodiment, the receipt of the stream of audio information from the microphone comprises receipt of discrete audio information from the microphone and causation of storage of the discrete audio information in a buffer.

In at least one example embodiment, the buffer is a volatile memory buffer.

In at least one example embodiment, the repository is a nonvolatile memory repository.

In at least one example embodiment, the receipt of the stream of audio information is performed prior to the determination that the user of the apparatus has performed the action that is consistent with the handshake greeting.

In at least one example embodiment, the receipt of the stream of audio information is caused, at least in part, by the determination that the user of the apparatus has performed the action that is consistent with the handshake greeting.

One or more example embodiments further perform preclusion of receipt of the stream of audio information prior to the determination that the user of the apparatus has performed the action that is consistent with the handshake greeting.

One or more example embodiments further perform determination that a post-handshake greeting duration has elapsed, and termination of receipt of the stream of audio information based, at least in part, on the determination that the post-handshake greeting duration has elapsed.

In at least one example embodiment, the termination of receipt of the stream of audio information causes preclusion of receipt of the stream of audio information from the microphone.

In at least one example embodiment, the determination that the post-handshake greeting duration has elapsed comprises determination that the post-handshake greeting duration has elapsed since the determination that the user of the apparatus has performed the action that is consistent with the handshake greeting.

One or more example embodiments further perform determination that the user has performed an action that is consistent with a preparative portion of the handshake greeting, wherein the determination that the post-handshake greeting duration has elapsed comprises determination that the post-handshake greeting duration has elapsed since the determination that the user has performed an action that is consistent with the preparative portion of the handshake greeting.

In at least one example embodiment, the determination that the user of the apparatus has performed the action that is consistent with the handshake greeting is based, at least in part, on the determination that the user has performed an action that is consistent with the preparative portion of the handshake greeting.

One or more example embodiments further perform determination that the user has performed an action that is consistent with a contact portion of the handshake greeting, wherein the determination that the post-handshake greeting duration has elapsed comprises determination that the post-handshake greeting duration has elapsed since the determination that the user has performed an action that is consistent with the contact portion of the handshake greeting.

One or more example embodiments further perform determination that the user has performed an action that is consistent with a release portion of the handshake greeting, wherein the determination that the post-handshake greeting duration has elapsed comprises determination that the post-handshake greeting duration has elapsed since the determination that the user has performed an action that is consistent with the release portion of the handshake greeting.

One or more example embodiments further perform determination that the user of the apparatus has performed an action that is consistent with at least part of another handshake greeting, wherein the determination that the post-handshake greeting duration has elapsed is based, at least in part, on the other handshake greeting.

In at least one example embodiment, the determination that the post-handshake greeting duration has elapsed comprises determination that the post-handshake greeting duration has elapsed since the determination that the user of the apparatus has performed the action that is consistent with the other handshake greeting.

One or more example embodiments further perform determination that the user has performed an action that is consistent with a preparative portion of the other handshake greeting, wherein the determination that the post-handshake greeting duration has elapsed comprises determination that the post-handshake greeting duration has elapsed since the determination that the user has performed an action that is consistent with the preparative portion of the other handshake greeting.

One or more example embodiments further perform determination that the user has performed an action that is consistent with a contact portion of the other handshake greeting, wherein the determination that the post-handshake greeting duration has elapsed comprises determination that the post-handshake greeting duration has elapsed since the determination that the user has performed an action that is consistent with the contact portion of the other handshake greeting.

One or more example embodiments further perform determination that the user has performed an action that is consistent with a release portion of the other handshake greeting, wherein the determination that the post-handshake greeting duration has elapsed comprises determination that the post-handshake greeting duration has elapsed since the determination that the user has performed an action that is consistent with the release portion of the other handshake greeting.

One or more example embodiments further perform determination that a post-handshake greeting duration has elapsed, wherein the determination of the handshake greeting audio information is based, at least in part, on the determination that the post-handshake greeting duration has elapsed.

In at least one example embodiment, the determination of the handshake greeting audio information comprises determination of the handshake greeting audio information to include a portion of the stream of audio information that corresponds with audio information received prior to the determination that the post-handshake greeting duration has elapsed.

In at least one example embodiment, the determination of the handshake greeting audio information comprises determination of the handshake greeting audio information to exclude a portion of the stream of audio information that corresponds with audio information received subsequent to the determination that the post-handshake greeting duration has elapsed.

In at least one example embodiment, the determination of the handshake greeting audio information comprises determination of a handshake greeting audio information start based, at least in part, on the determination that the user of the apparatus has performed the action that is consistent with the handshake greeting, and the determination of the handshake greeting audio information comprises determination of the handshake greeting audio information to include a portion of the stream of audio information that corresponds with audio information received subsequent to the handshake greeting audio information start.

In at least one example embodiment, the determination of the handshake greeting audio information comprises determination of a handshake greeting audio information start based, at least in part, on the determination that the user of the apparatus has performed the action that is consistent with the handshake greeting, and the determination of the handshake greeting audio information comprises determination of the handshake greeting audio information to exclude a portion of the stream of audio information that corresponds with audio information received prior to the handshake greeting audio information start.

In at least one example embodiment, the handshake greeting audio information start corresponds with the determination that the user of the apparatus has performed the action that is consistent with the handshake greeting.

In at least one example embodiment, the handshake greeting audio information start corresponds with a pre-handshake greeting duration prior to the determination that the user of the apparatus has performed the action that is consistent with the handshake greeting.

In at least one example embodiment, the handshake greeting audio information is audio information associated with the handshake greeting.

One or more example embodiments further perform receipt of information indicative of a handshake greeting audio information rendering input, and causation of rendering of the handshake greeting audio information based, at least in part, on the handshake greeting audio information rendering input.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
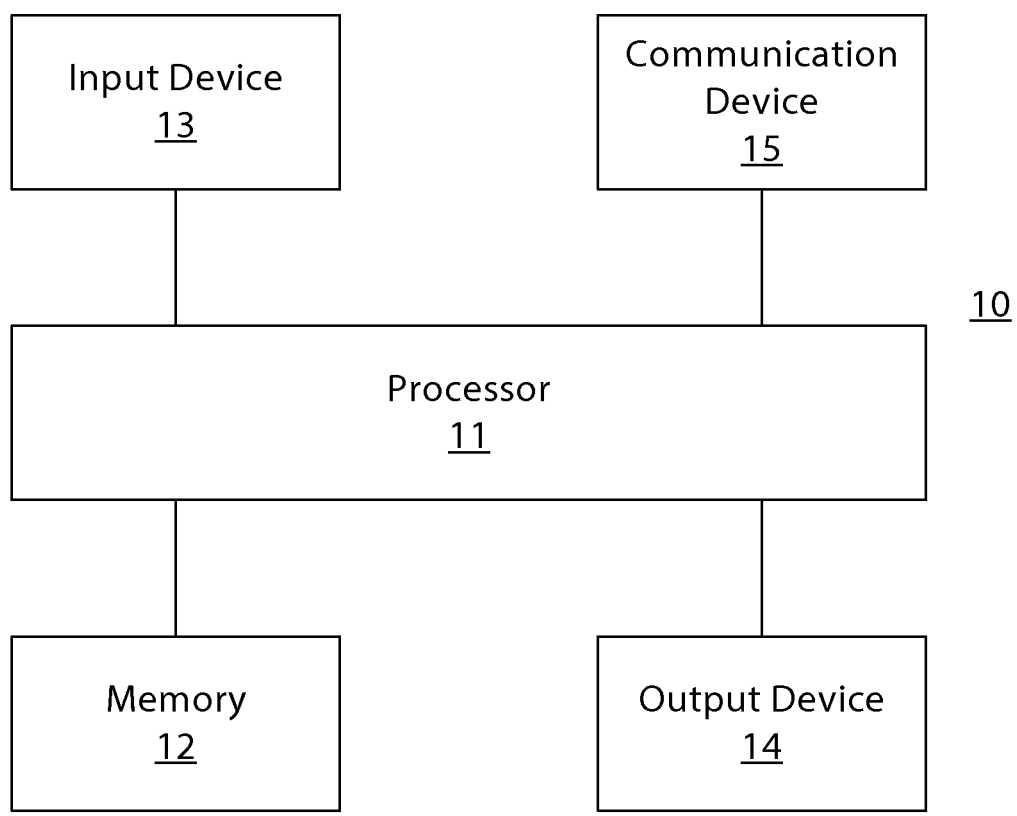
FIG. 1 is a block diagram showing an apparatus according to at least one example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a wearable apparatus, a head worn apparatus, a head mounted display apparatus, a wrist worn apparatus, a watch apparatus, a finger worn apparatus, a ring apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement.

The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
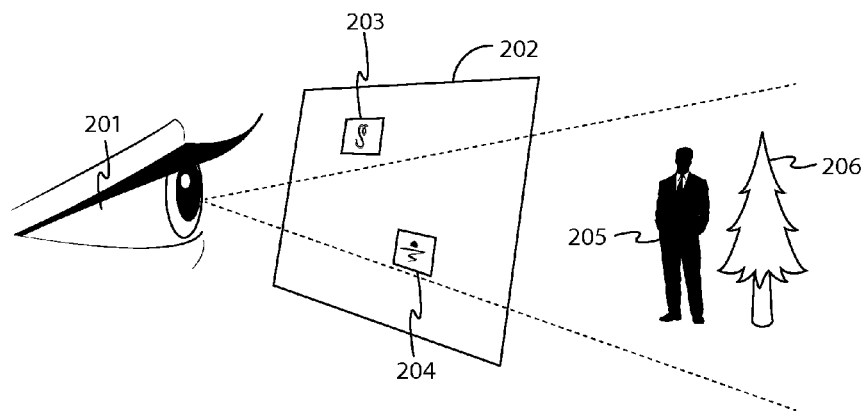
FIGS. 2A-2B are diagrams illustrating see through displays according to at least one example embodiment.
Figure 2B:
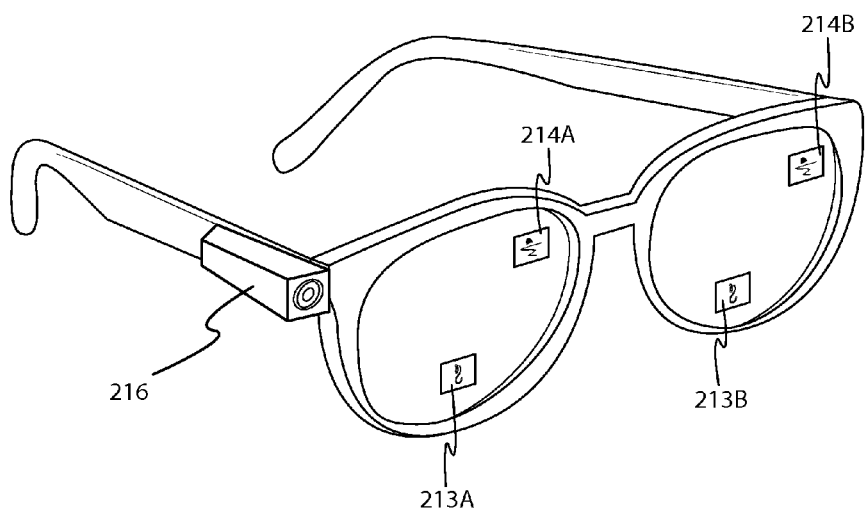

FIGS. 2A-2B are diagrams illustrating see through displays according to at least one example embodiment. The examples of FIGS. 2A-2B are merely examples and do not limit the scope of the claims. For example, configuration of the see through display may vary, relationship between the user and the see through display may vary, shape of the see through display may vary, opacity of the see through display may vary, and/or the like.

In modern times, electronic apparatuses are becoming more prevalent and pervasive. Users often utilize such apparatuses for a variety of purposes. For example, a user may utilize an apparatus to view information that is displayed on a display of the apparatus, to perceive information associated with the user's surroundings on the display of the apparatus, and/or the like. In many circumstances, a user may desire to view information associated with an apparatus in a way that is noninvasive, nonintrusive, discreet, and/or the like. In such circumstances, it may be desirable for a display to be a see through display. In at least one example embodiment, a see through display is a display that presents information to a user, but through which objects on an opposite side of the display from the user may be seen. For example, an object on the opposite side of the display may be perceivable through the see through display. A see through display may be comprised by a window, a windshield, a visor, glasses, a head mounted display, and/or the like. In at least one example embodiment, an apparatus is a head mounted display. A head mounted display may, for example, be a display that is head mountable, a display that is coupled to an element that is wearable at a location on and/or proximate to the head of a user, a display that is wearable at a location on and/or proximate to the head of a user, and/or the like.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. For example, information 204 may be displayed at a position on display 202 such that information 204 is aligned with a line of sight between user 201 and object 206. For example, user 201 may perceive information 204 to be overlapping object 206, to partially correspond with object 206 in the user's field of view through display 202, and/or the like. In such an example, information 203 may be associated with, identify, and/or the like, object 205. For example, information 203 may indicate an identity of object 205. In at least one example embodiment, display 202 may be comprised by a head mounted display.

FIG. 2B is a diagram illustrating a see through display according to at least one example embodiment. In at least one example embodiment, a see through display is a near eye display. A near eye display may be a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be associated with information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

In many circumstances, a user of an electronic apparatus may desire to capture images, video, and/or the like, by way of a camera module. For example, the user may desire to capture an image of a landscape, to capture video of a performance, and/or the like. In at least one example embodiment, an apparatus comprises a camera module. The camera module may be configured such that the camera module may capture visual information within a capture region of the camera module.

Figure 3:
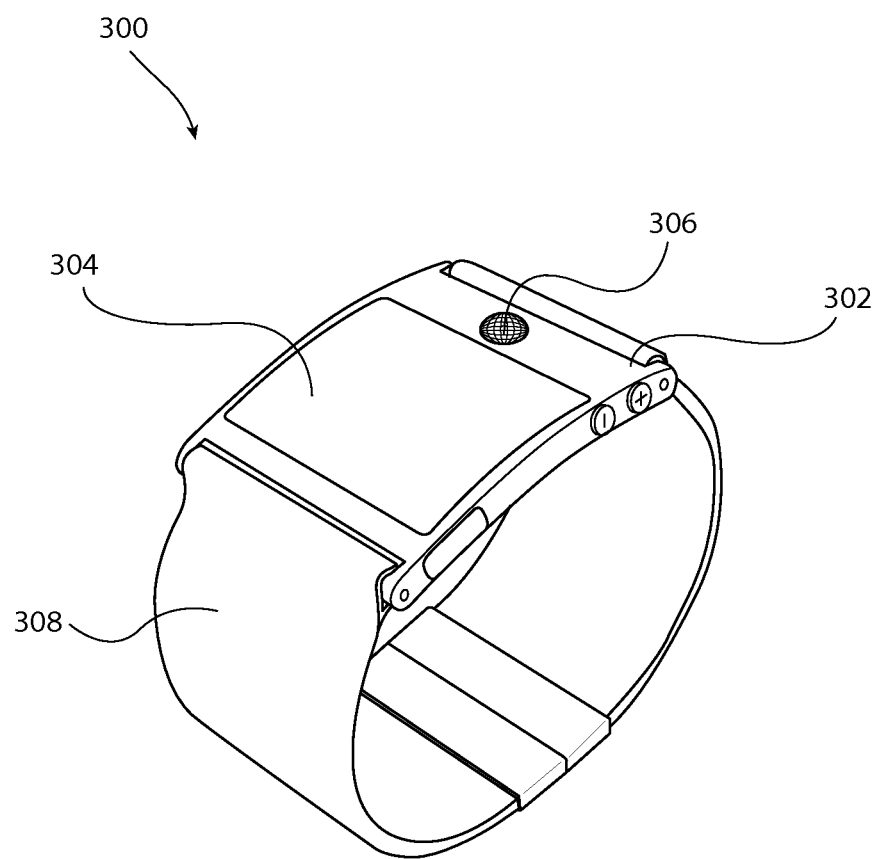
FIG. 3 is a diagram illustrating a wrist worn apparatus according to at least one example embodiment.

FIG. 3 is a diagram illustrating a wrist worn apparatus according to at least one example embodiment. The example of FIG. 3 is merely an example and does not limit the scope of the claims. For example, wrist worn apparatus design may vary, configuration of the wrist worn apparatus may vary, display configuration may vary, and/or the like.

As electronic apparatuses become more prevalent, many users may desire to interact with electronic apparatuses in manners that are intuitive, convenient, accessible, and/or the like. For example, a user may desire to interact with an electronic apparatus that may be unobtrusive to interact with, convenient to interact with, and/or the like. In at least one example embodiment, an apparatus is a wrist worn apparatus. A wrist worn apparatus may be a watch apparatus, a bracelet apparatus, and/or the like. In at least one example embodiment, a wrist worn apparatus comprises a wrist adherence portion. In at least one example embodiment, the wrist adherence portion is a part of the housing of the wrist worn apparatus that is configured to cause the wrist worn apparatus to adhere to a user's wrist, avoid falling from the user's wrist, and/or the like. For example, the wrist adherence portion may be a housing that is configured to at least partially surround a wrist of a wearer of the wrist worn apparatus. In such an example, the wrist adherence portion may be a band, a strap, a bracelet, and/or the like. The wrist adherence portion of the wrist worn apparatus may be rigid, flexible, stretchy, foldable, curvable, deformable, bendable, and/or the like. For example, the wrist adherence portion of the wrist worn apparatus may be a non-curved band that a user can configure such that the non-curved band curves and wraps around the wrist of the user.

In many circumstances, a user may desire to have a wrist worn apparatus to display information. For example, the user may desire the wrist worn apparatus to display information of particular interest to the user, to display visual information that may appeal to the user, and/or the like. In at least one example embodiment, an apparatus comprises a display. The display may be a light emitting diode display, an electronic ink display, a liquid crystal display, an organic light emitting diode display, and/or the like. In at least one example embodiment, a display is coupled with a display housing. In such an example embodiment, the wrist adherence portion of the wrist worn apparatus may be removeably coupled with the display housing, permanently coupled with the display housing, flexibly coupled with the display housing, rigidly coupled with the display housing, and/or the like.

FIG. 3 is a diagram illustrating a wrist worn apparatus according to at least one example embodiment. The example of FIG. 3 depicts wrist worn apparatus 300. In the example of FIG. 3, wrist worn apparatus 300 comprises display housing 302, wrist adherence portion 308, display 304, and microphone 306. Microphone 306 may be an omnidirectional microphone, a directional microphone, and/or the like. As is depicted in FIG. 3, wrist adherence portion 308 is rotatably coupled with display housing 302 on either side of display housing 302. Display 304 and microphone 306 are coupled with display housing 302.

In the example of FIG. 3, wrist adherence portion 308 is a strap that adheres wrist worn apparatus 300 to a user's wrist, such that wrist worn apparatus 300 is secured to the user's wrist and does not fall off of the user's wrist. When worn about the wrist of the user, wrist worn apparatus 300 may be oriented such that display 304 and microphone 306 face in a direction that is generally facing the user, such that the user may perceive information displayed on display 304 of wrist worn apparatus 300, may speak in a direction that faces towards microphone 306, and/or the like.

Figure 4A:
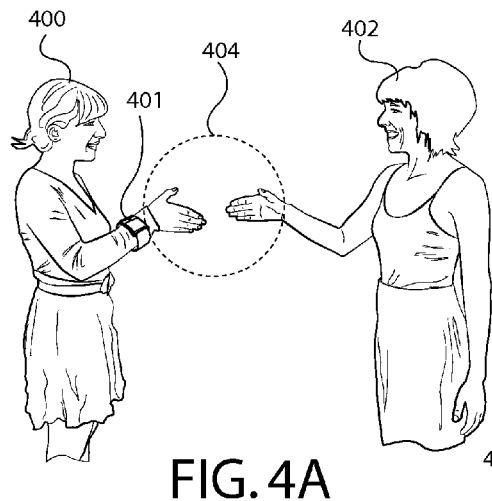
FIGS. 4A-4C are diagrams illustrating a handshake greeting according to at least one example embodiment.
Figure 4B:
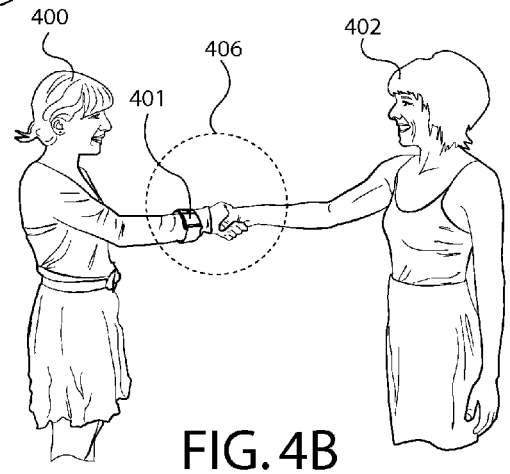
Figure 4C:
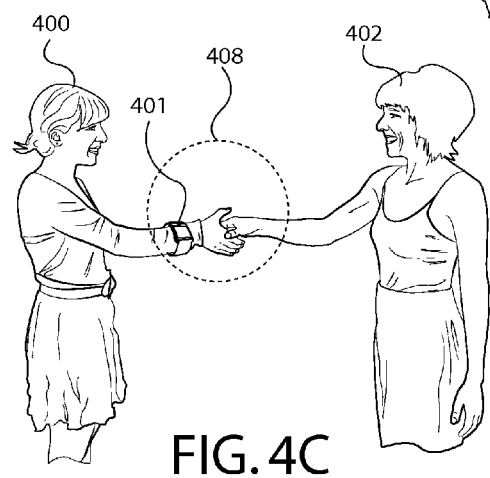

FIGS. 4A-4C are diagrams illustrating a handshake greeting according to at least one example embodiment. The examples of FIGS. 4A-4C are merely examples and do not limit the scope of the claims. For example, apparatus configuration may vary, handshake greetings may vary, portions of the handshake greeting may vary, and/or the like.

As electronic apparatuses become increasingly prevalent and pervasive in our society, users of electronics apparatuses increasingly depend on their electronic apparatuses to assist the users in various aspects of the users' lives. Many users rely on their electronic apparatus for purposes relating to interpersonal interactions. For example, a user may maintain an address book on the user's electronic apparatus, may contact business connections via their electronic apparatus, and/or the like.

In many circumstances, a user of an electronic apparatus may meet a new acquaintance, may be introduced to a new colleague, and/or the like. As is often customary, the user may greet the other individual and exchange names, employment information, contact information, and/or the like. In such circumstances, the user and the other individual may share a handshake greeting. That is to say that the user and the other individual may shake each other's hand while introducing themselves, may shake each other's hand and then introduce themselves, may introduce themselves and then shake each other's hand, and/or the like. In such circumstances, it may be desirable to configure the apparatus such that the apparatus may facilitate remembrance of the other individual's name, contact information, employment information, and/or the like. For example, the apparatus may be configured such that the apparatus may determine occurrence of a handshake greeting, may record audio information temporally proximate to the handshake greeting, and/or the like. In such an example, the user of the apparatus may review the audio information in order to identify individuals to whom the user was introduced to, to facilitate remembrance of names of individuals with whom the user may collaborate with in the future, and/or the like.

In many circumstances, it may be desirable to perform one or more operations based, at least in part, on performance of a handshake greeting. For example, it may be desirable to perform an operation associated with receipt of audio information from a microphone, storage of audio information received from the microphone, and/or the like, in response to a user of an apparatus performing a handshake greeting. In at least one example embodiment, an apparatus determines that a user of the apparatus has performed an action that is consistent with at least part of a handshake greeting. For example, the apparatus may determine that the user has performed a handshake greeting, has performed at least a part of the handshake greeting, and/or the like. The part of the handshake greeting may be a preparative portion of the handshake greeting, a contact portion of the handshake greeting, a release portion of the handshake greeting, and/or the like.

In at least one example embodiment, determination that the user of the apparatus has performed the action that is consistent with the handshake greeting comprises receipt of sensor information. In such an example embodiment, the apparatus may determine that the sensor information is consistent with the user of the apparatus performing the handshake greeting, at least a part of the handshake greeting, at least a portion of the handshake greeting, and/or the like. For example, the apparatus may determine that the sensor information is consistent with the user of the apparatus performing a preparative portion of the handshake greeting, a contact portion of the handshake greeting, a release portion of the handshake greeting, and/or the like.

In some circumstances, it may be desirable to determine that a user has performed at least a part of a handshake greeting based, at least in part, on visual information. In at least one example embodiment, the sensor information is visual information. In such an example embodiment, the determination that the sensor information is consistent with the user of the apparatus performing the handshake greeting may comprise visual gesture recognition of the handshake greeting based, at least in part, on the visual information. For example, as illustrated in the example of FIG. 2B, camera module 216 may be oriented such that a capture region associated with camera module 216 corresponds with at least part of a handshake greeting performed by the user of the apparatus, with at least part of the other individual with whom the handshake greeting is being performed, and/or the like.

In some circumstances, it may be desirable to determine that a user has performed at least a part of a handshake greeting based, at least in part, on motion information. In at least one example embodiment, the sensor information is motion information. In such an example embodiment, the determination that the sensor information is consistent with the user of the apparatus performing the handshake greeting may comprise motion gesture recognition of the handshake greeting based, at least in part, on the motion information. The motion information may be received from a motion sensor, such as an accelerometer sensor, a gyroscopic sensor, and/or the like. For example, the apparatus may receive motion information from one or more motion sensors. In such an example, the apparatus may determine that the user of the apparatus has performed a preparative portion of the handshake greeting, a contact portion of the handshake greeting, a release portion of the handshake greeting, and/or the like, based, at least in part, on the motion information. For example, the motion information may indicate that the user of the apparatus thrust her hand forward and, subsequently, shook her hand vertically. In such an example, the apparatus may determine that the user of the apparatus performed a preparative portion of a handshake greeting and a contact portion of the handshake greeting based, at least in part, on the motion information.

In some circumstances, it may be desirable to determine that a user has performed at least a part of a handshake greeting based, at least in part, on hand position information. In at least one example embodiment, the sensor information is hand position information. In such an example embodiment, the determination that the sensor information is consistent with the user of the apparatus performing the handshake greeting may comprise hand position gesture recognition of the handshake greeting based, at least in part, on the hand position information. In such an example embodiment, the hand position information may comprise information that indicates a hand position of the user. For example, the apparatus may be a wrist worn apparatus similar as described regarding FIG. 3. In such an example, the apparatus may comprise capacitive sensors that receive physiological information indicative of nerve impulses, muscle movements, and or the like. In such circumstances, the apparatus may evaluate such physiological information to determine the hand position information, the orientation of the apparatus on the user's wrist, and/or the like. Such capacitive sensors may be housed by the apparatus at various positions that allow for detection of such physiological information. For example, as illustrated in the example of FIG. 3, the capacitive sensors may be housed by wrist adherence portion 308 of wrist worn apparatus 300, display housing 302 of wrist worn apparatus 300, and/or the like. In such an example, the capacitive sensors may be positioned such that the capacitive sensors may be in contact with the skin of a user that is wearing wrist worn apparatus 300 around the user's wrist.

FIG. 4A is a diagram illustrating a preparative portion of a handshake greeting according to at least one example embodiment. In the example of FIG. 4A, user 400 is performing a preparative portion of a handshake greeting with individual 402. In the example of FIG. 4A, user 400 is utilizing apparatus 401. As can be seen, apparatus 401 is a wrist worn apparatus similar as described regarding FIG. 3. In the example of FIG. 4A, apparatus 401 may determine that user 400 is performing at least a part of a handshake greeting with individual 402. For example, apparatus 401 may determine that user 400 is performing a preparative portion of the handshake greeting with individual 402. For example, apparatus 401 may comprise one or more motion sensor, and may determine that user 400 is performing the preparative portion of the handshake greeting with individual 402 by way of motion information that indicates that user 400 thrust her hand away from her body, that user 400 raised her arm from her side and moved her arm outwards from her body, and/or the like. For example, apparatus 401 may comprise one or more motion sensor, orientation sensor, and/or the like. In such an example, apparatus 401 may determine that user 400 has thrust her arm forward based, at least in part, on sensor information received from at least one of the motion sensor or orientation sensor that may indicate horizontal motion, horizontal acceleration, and/or the like. In another example, apparatus 401 may determine that user 400 has raised her arm from her side and moved her arm outwards from her body based, at least in part, on sensor information indicative of a 90-degree reorientation of apparatus 401. Such a reorientation of apparatus 401 may indicate that user 400 has repositioned her hand from her side to a position associated with a preparative portion of a handshake greeting.

In another example, apparatus 401 may comprise one or more capacitive sensor, and may determine that user 400 is performing the preparative portion of the handshake greeting with individual 402 by way of hand position information that indicates that the hand of user 400 is extended in front of user 400, that the fingers of user 400 are extended and slightly curved, that the hand of user 400 is tensed, and/or the like. For example, apparatus 401 may comprise one or more capacitive sensors that may be housed by a wrist adherence portion of apparatus 401 such that the capacitive sensors are in contact with the skin of user 400. In such an example, apparatus 401 may determine particular physiological information associated with user 400 based, at least in part, on information received from the capacitive sensors. In such an example, apparatus 401 may determine a hand position of user 400 based, at least in part, on the evaluation of the physiological information in order to facilitate determination of the hand position of user 400, the orientation of apparatus 401 on the wrist of user 400, and/or the like. As such, apparatus 400 may determine that the fingers of user 400 are extended and slightly curved, that the hand of user 400 is tensed, and/or the like, based, at least in part, on sensor information received from such capacitive sensors.

FIG. 4B is a diagram illustrating a contact portion of a handshake greeting according to at least one example embodiment. In the example of FIG. 4B, user 400 is utilizing apparatus 401, and is performing a contact portion of a handshake greeting with individual 402. The example of FIG. 4B may occur subsequent to the preparation portion of the handshake greeting that is illustrated in the example of FIG. 4A. In the example of FIG. 4B, apparatus 401 may determine that user 400 is performing at least a part of a handshake greeting with individual 402. For example, apparatus 401 may determine that user 400 is performing a contact portion of the handshake greeting with individual 402. For example, apparatus 401 may comprise one or more motion sensor, and may determine that user 400 is performing the contact portion of the handshake greeting with individual 402 by way of motion information that indicates that user 400 is shaking her hand in a vertical orientation, that user 400 raised her arm from her side, moved her arm outwards from her body, and began shaking her hand vertically, and/or the like. In another example, apparatus 401 may comprise one or more capacitive sensor, and may determine that user 400 is performing the contact portion of the handshake greeting with individual 402 by way of hand position information that indicates that the hand of user 400 is clenched in a cupped manner, that the fingers of user 400 are extended, slightly curved, and clasping an object, that the hand of user 400 is tensed, and/or the like. For example, apparatus 401 may comprise one or more capacitive sensors that may be housed by a wrist adherence portion of apparatus 401 such that the capacitive sensors are in contact with the skin of user 400. In such an example, apparatus 400 may determine that the hand of user 400 is clenched in a cupped manner, that the fingers of user 400 are extended, slightly curved, and clasping an object, that the hand of user 400 is tensed, and/or the like, based, at least in part, on sensor information received from such capacitive sensors.

FIG. 4C is a diagram illustrating a release portion of a handshake greeting according to at least one example embodiment. In the example of FIG. 4C, user 400 is utilizing apparatus 401, and is performing a release portion of a handshake greeting with individual 402. The example of FIG. 4C may occur subsequent to the contact portion of the handshake greeting that is illustrated in the example of FIG. 4B. In the example of FIG. 4C, apparatus 401 may determine that user 400 is performing at least a part of a handshake greeting with individual 402. For example, apparatus 401 may determine that user 400 is performing a release portion of the handshake greeting with individual 402. For example, apparatus 401 may comprise one or more motion sensor, and may determine that user 400 is performing the release portion of the handshake greeting with individual 402 by way of motion information that indicates that user 400 has discontinued shaking her hand in a vertical orientation, that the hand of user 400 is being moved towards the body of user 400, and/or the like. For example, apparatus 401 may comprise one or more motion sensor, orientation sensor, and/or the like. In such an example, apparatus 401 may determine that the hand of user 400 is being moved towards the body of user 400 based, at least in part, on sensor information received from at least one of the motion sensor or orientation sensor that may indicate horizontal motion, horizontal acceleration, and/or the like. For example, the sensor information may indicate that apparatus 401 moved forward in a direction and, subsequently, moved backwards in an opposite direction. In this manner, as apparatus 401 is attached to the wrist of user 400, such sensor information may indicate that user 400 moved her hand away from her body and, subsequently, retracted her hand towards her body. Such a retraction may be indicative of termination of a handshake greeting with individual 402.

In another example, apparatus 401 may comprise one or more capacitive sensor, and may determine that user 400 is performing the release portion of the handshake greeting with individual 402 by way of hand position information that indicates that the hand of user 400 has released from a clenched position, that user 400 has released the tension in the user's hand, and/or the like. For example, apparatus 401 may comprise one or more capacitive sensors that may be housed by a wrist adherence portion of apparatus 401 such that the capacitive sensors are in contact with the skin of user 400. In such an example, apparatus 400 may determine that the hand of user 400 has released from a clenched position, that user 400 has released the tension in the user's hand, and/or the like, based, at least in part, on sensor information received from such capacitive sensors.

FIGS. 5A-5D are diagrams illustrating handshake greeting audio information according to at least one example embodiment. The examples of FIGS. 5A-5D are merely examples and do not limit the scope of the claims. For example, handshake greeting count may vary, post-handshake greeting duration may vary, handshake greeting audio information start may vary, and/or the like.

As discussed previously, it may be desirable to configure an apparatus such that the apparatus records audio information associated with a handshake greeting, stores audio information that may be relevant to the handshake greeting, and/or the like. In at least one example embodiment, an apparatus receives a stream of audio information from a microphone. The microphone may be an omnidirectional microphone, a directional microphone, and/or the like. The microphone may be comprised by the apparatus, comprised by a separate apparatus, and/or the like. In at least one example embodiment, receipt of a stream of audio information from the microphone may comprise receipt of discrete audio information from the microphone.

In many circumstances, it may be desirable to store the audio information received from the microphone in a buffer. For example, it may be desirable to aggregate a predetermined amount of audio information in the buffer, to continually store audio information in the buffer such that at a specific point in time, the buffer comprises audio information associated with a predetermined duration from the specific point in time, and/or the like. In at least one example embodiment, an apparatus causes storage of the discrete audio information in the buffer. In at least one example embodiment, the buffer is a volatile memory buffer. For example, the buffer may be associated with a range of address space within volatile memory, a block of address space within volatile memory, and/or the like. There are many ways to configure a buffer such that the buffer may store audio information received from a microphone, and likely many more ways to do so in the future. As such, the exact manner in which the buffer stored the audio information does not necessarily limit the scope of the claims.

In some circumstances, it may be desirable to configure an apparatus such that the apparatus is continually receiving audio information from a microphone. As such, in at least one example embodiment, receipt of the stream of audio information is performed prior to the determination that the user of the apparatus has performed the action that is consistent with the handshake greeting. In many circumstances, it may be desirable to limit the receipt of a stream of audio information. For example, it may be desirable to limit the receipt of the stream of audio information for reasons associated with a limited storage capacity, limited resource allocation, power conservation, and/or the like. As such, in at least one example embodiment, the receipt of the stream of audio information is caused, at least in part, by the determination that the user of the apparatus has performed the action that is consistent with the handshake greeting. For example, the apparatus may initiate storage of the audio information in a buffer based, at least in part, on the determination that the user of the apparatus has performed the action that is consistent with the handshake greeting. In this manner, it may be desirable to preclude receipt of a stream of audio information prior to a determination that the user of the apparatus has performed the action that is consistent with the handshake greeting. In at least one example embodiment, an apparatus precludes receipt of the stream of audio information prior to the determination that the user of the apparatus has performed the action that is consistent with the handshake greeting.

In many circumstances, the handshake greeting may be associated with a verbal introduction, an auditory conversation between the user of the apparatus and another individual, an exchange of verbal pleasantries, and/or the like. In such circumstances, it may be desirable to limit the duration of audio information to be associated with the handshake greeting, to be caused to be stored in association with the handshake greeting, and/or the like. In many circumstances, a user may desire to cause storage of potentially relevant audio information, and to avoid storage of likely irrelevant audio information. As such, it may be desirable to discontinue receipt of the stream of audio information after a certain duration has elapsed subsequent to a handshake greeting. In at least one example embodiment, an apparatus determines that a post-handshake greeting duration has elapsed. In such an example embodiment, the determination that the post-handshake greeting duration has elapsed may comprise determination that the post-handshake greeting duration has elapsed since the determination that the user of the apparatus has performed the action that is consistent with the handshake greeting. In at least one example embodiment, an apparatus terminates receipt of the stream of audio information based, at least in part, on the determination that the post-handshake greeting duration has elapsed. As such, the termination of receipt of the stream of audio information may cause preclusion of receipt of the stream of audio information from the microphone, preclusion of storage of the audio information received from the microphone, and/or the like. In this manner, a stream of audio information may be received during the post-handshake greeting duration, prior to elapsing of the post-handshake greeting duration, and/or the like.

In some circumstances, it may be desirable to more precisely control the initiation and/or termination of receipt of audio information from a microphone, the determination of handshake greeting audio information, and/or the like. For example, it may be desirable to configure an apparatus such that the apparatus may be responsive to a verbal introduction that may be performed between the user and an individual. For example, receipt of audio information from the microphone may terminate based, at least in part, on the user confirming understanding of the individual's name, on the user repeating the individual's name, and/or the like. In such an example, an individual may introduce himself as Tom. Subsequently, the user may state, "It is very nice to meet you Tom, my name is Joe." In this manner, the repetition of the individual's name may indicate that the user has acknowledged hearing the individual's name, and may cause termination of receipt of audio information, may affect the determination of the handshake greeting audio information, and/or the like.

In some circumstances, it may be desirable to determine a post-handshake greeting duration based, at least in part, on receipt of audio information that corresponds with a verbal introduction of an individual. For example, once an apparatus determines that the apparatus has received audio information that corresponds with a name of an individual, an identifier associated with the individual, etc., it may be desirable to record for an additional 5 seconds from the receipt of audio information indicative of a last name, an additional 10 seconds from the receipt of audio information indicative of a first name, and/or the like. In some circumstances, the name of the individual may be tied to an event guest list, a company roster, and/or the like. In such circumstances, a user may desirable to be prompted that the individual with whom the handshake greeting is being performed with in a particular individual, holds a certain position within a company, is a special guest, and/or the like. In this manner, the user may then perform a special greeting, may put forth extra effort with their introduction, and/or the like.

In another example, a user may desire the user's apparatus to be configured such that information associated with the handshake greeting is shared by way of a social networking platform, a communication service, and/or the like. For example, if a user meets an important figure head of a large corporation and performs a handshake greeting with the figurehead, the user may desire to share such information with business acquaintances, friends, and/or the like. In such an example, an apparatus may determine that the user, Jane Doe, has performed at least part of a handshake greeting with John Smith. As such, the apparatus may cause communication of, sharing of, etc. a message that is indicative of the handshake greeting. For example, the apparatus may cause a connection request to be sent to John Smith, cause a message indicating that Jane Doe met John Smith, and/or the like.

Figure 5A:
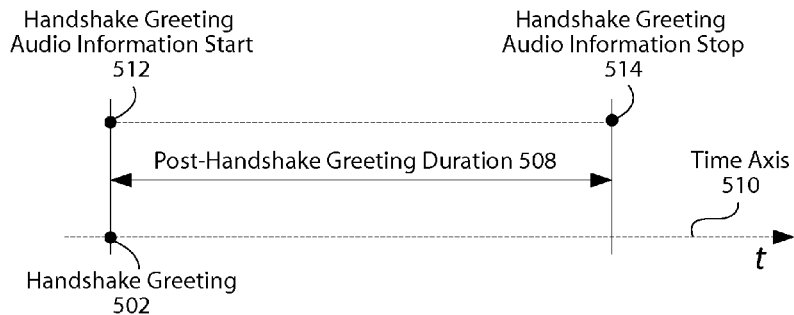
FIGS. 5A-5D are diagrams illustrating handshake greeting audio information according to at least one example embodiment.

FIG. 5A is a diagram illustrating handshake greeting audio information according to at least one example embodiment. The example of FIG. 5A illustrates handshake greeting 502, post-handshake greeting duration 508, handshake greeting audio information start 512, and handshake greeting audio information stop 514 in relation to time axis 510. Handshake greeting 502 may be a handshake greeting, at least a part of a handshake greeting, a preparative portion of a handshake greeting, a contact portion of a handshake greeting, a release portion of a handshake greeting, and/or the like. In the example of FIG. 5A, handshake greeting audio information start 512 corresponds with a time of handshake greeting 502. As such, the apparatus may have initiated receipt of audio information from a microphone at the time associated with handshake greeting 502, may have determined the handshake greeting audio information based, at least in part, on a stream of audio information received prior to handshake greeting 502, and/or the like. In the example of FIG. 5A, the handshake greeting audio information corresponds with the duration between handshake greeting audio information start 512 and handshake greeting audio information stop 514. As such, the handshake greeting audio information corresponds with post-handshake greeting duration 508. As such, handshake greeting audio information stop 514 corresponds with the elapsing of post-handshake greeting duration 508.

In many circumstances, it may be desirable to determine that the post-handshake greeting duration has elapsed since the determination that the user of the apparatus has performed an action that is consistent with a particular portion of a handshake greeting, for example, a preparative portion of a handshake greeting, a contact portion of a handshake greeting, a release portion of a handshake greeting, and/or the like. For example, a verbal introduction that is associated with a handshake greeting may ordinarily occur prior to performance of the handshake greeting, simultaneous with performance of the handshake greeting, subsequent to performance of the handshake greeting, and/or the like. As such, it may be desirable associate a post-handshake greeting duration with a particular portion of a handshake greeting such that audio information received within the post-handshake greeting duration will likely comprise relevant audio information, audio information associated with a verbal introduction, and/or the like. In at least one example embodiment, an apparatus determines that the user has performed an action that is consistent with a preparative portion of the handshake greeting. In such an example embodiment, the determination that the post-handshake greeting duration has elapsed may comprise determination that the post-handshake greeting duration has elapsed since the determination that the user has performed an action that is consistent with the preparative portion of the handshake greeting. For example, in some circumstances, it may be desirable to determine occurrence of a handshake greeting at a time associated with an initiation of the handshake greeting, a beginning of the handshake greeting, and/or the like. As such, the determination that the user of the apparatus has performed the action that is consistent with the handshake greeting may be based, at least in part, on the determination that the user has performed an action that is consistent with the preparative portion of the handshake greeting.

In at least one example embodiment, an apparatus determines that the user has performed an action that is consistent with a contact portion of the handshake greeting. In such an example embodiment, the determination that the post-handshake greeting duration has elapsed may comprise determination that the post-handshake greeting duration has elapsed since the determination that the user has performed an action that is consistent with the contact portion of the handshake greeting. For example, in some circumstances, it may be desirable to determine occurrence of a handshake greeting at a time associated with physical shaking of an individual's hand, a middle of the handshake greeting, and/or the like. As such, the determination that the user of the apparatus has performed the action that is consistent with the handshake greeting may be based, at least in part, on the determination that the user has performed an action that is consistent with the contact portion of the handshake greeting.

In at least one example embodiment, an apparatus determines that the user has performed an action that is consistent with a release portion of the handshake greeting. In such an example embodiment, the determination that the post-handshake greeting duration has elapsed may comprise determination that the post-handshake greeting duration has elapsed since the determination that the user has performed an action that is consistent with the release portion of the handshake greeting. For example, in some circumstances, it may be desirable to determine occurrence of a handshake greeting at a time associated with a termination of the handshake greeting, a release of tension in the user's hand, a discontinuation of physically shaking the individual's hand, and/or the like. As such, the determination that the user of the apparatus has performed the action that is consistent with the handshake greeting may be based, at least in part, on the determination that the user has performed an action that is consistent with the release portion of the handshake greeting.

Figure 5B:

FIG. 5B is a diagram illustrating handshake greeting audio information according to at least one example embodiment. The example of FIG. 5B illustrates handshake greeting portion 522, handshake greeting portion 524, post-handshake greeting duration 528, handshake greeting audio information start 532, and handshake greeting audio information stop 534 in relation to time axis 530. Each of handshake greeting portions 522 and 524 may be at least a part of a handshake greeting, a preparative portion of a handshake greeting, a contact portion of a handshake greeting, a release portion of a handshake greeting, and/or the like. In the example of FIG. 5B, handshake greeting audio information start 532 corresponds with a time of handshake greeting portion 522. As such, the apparatus may have initiated receipt of audio information from a microphone at the time associated with handshake greeting portion 522, may have determined the handshake greeting audio information based, at least in part, on a stream of audio information received prior to handshake greeting portion 522, and/or the like. In the example of FIG. 5B, the handshake greeting audio information corresponds with the duration between handshake greeting audio information start 532 and handshake greeting audio information stop 534. As such, the handshake greeting audio information corresponds with the time between handshake greeting portion 522 and handshake greeting portion 524, and post-handshake greeting duration 528. As such, handshake greeting audio information stop 534 corresponds with the elapsing of post-handshake greeting duration 528 subsequent to a time associated with the determination of greeting portion 524. In this manner, a post-handshake greeting duration that may have been associated with handshake greeting portion 522 may have been replaced by, supplemented by, etc. post-handshake greeting duration 528 that is associated with handshake greeting 524.

In many circumstances, a user may be introduced to many individuals in quick succession, may meet a large group of individuals and share introductions with each individual, and/or the like. In such circumstances, the user may perform more than one handshake greeting. As such, it may be desirable to receive audio information associated with all of the handshake greetings, audio information associated with each of the handshake greetings, and/or the like. In at least one example embodiment, an apparatus determines that the user of the apparatus has performed an action that is consistent with at least part of a handshake greeting. Subsequently, the apparatus may determine that the user of the apparatus has performed an action that is consistent with at least part of another handshake greeting. In such an example, the determination that the post-handshake greeting duration has elapsed may be based, at least in part, on the other handshake greeting. For example, the post-handshake greeting duration may be extended, the post-handshake greeting duration associated with the other handshake greeting may be appended to the post-handshake greeting duration associated with the handshake greeting, and/or the like. As such, the determination that the post-handshake greeting duration has elapsed may comprise determination that the post-handshake greeting duration has elapsed since the determination that the user of the apparatus has performed the action that is consistent with the other handshake greeting. For example, the determination that the post-handshake greeting duration has elapsed may comprise determination that the post-handshake greeting duration has elapsed since the determination that the user has performed an action that is consistent with the preparative portion of the other handshake greeting, the post-handshake greeting duration has elapsed since the determination that the user has performed an action that is consistent with the contact portion of the other handshake greeting, the post-handshake greeting duration has elapsed since the determination that the user has performed an action that is consistent with the release portion of the other handshake greeting, and/or the like.

Figure 5C:

FIG. 5C is a diagram illustrating handshake greeting audio information according to at least one example embodiment. The example of FIG. 5C illustrates handshake greeting 542, handshake greeting 544, post-handshake greeting duration 548, handshake greeting audio information start 552, and handshake greeting audio information stop 554 in relation to time axis 550. Handshake greeting 542 may be a handshake greeting, at least a part of a handshake greeting, a preparative portion of a handshake greeting, a contact portion of a handshake greeting, a release portion of a handshake greeting, and/or the like. Handshake greeting 544 may be another handshake greeting, at least a part of another handshake greeting, a preparative portion of another handshake greeting, a contact portion of another handshake greeting, a release portion of another handshake greeting, and/or the like. As such, an apparatus may have determined that a user of the apparatus performed an action that was consistent with at least part of handshake greeting 542 and, subsequently, performed an action that was consistent with at least part of handshake greeting 544. In the example of FIG. 5C, handshake greeting audio information start 552 corresponds with a time of handshake greeting 542. As such, the apparatus may have initiated receipt of audio information from a microphone at the time associated with handshake greeting 542, may have determined the handshake greeting audio information based, at least in part, on a stream of audio information received prior to handshake greeting 542, and/or the like. In the example of FIG. 5C, the handshake greeting audio information corresponds with the duration between handshake greeting audio information start 552 and handshake greeting audio information stop 554. As such, the handshake greeting audio information corresponds with the time between handshake greeting 542 and handshake greeting 544, and post-handshake greeting duration 548. As such, handshake greeting audio information stop 554 corresponds with the elapsing of post-handshake greeting duration 548 subsequent to a time associated with the determination of handshake greeting 544. In this manner, a post-handshake greeting duration that may have been associated with handshake greeting 542 may have been replaced by, supplemented by, etc. post-handshake greeting duration 548 that is associated with handshake greeting 544.

In many circumstances, it may be desirable to associate specific audio information with a handshake greeting. For example, it may be desirable to cause storage of discrete portions of audio information that are associated with discrete handshake greetings such that a user may subsequently review the audio information on a handshake greeting by handshake greeting basis. In at least one example embodiment, handshake greeting audio information is audio information associated with the handshake greeting. In at least one example embodiment, an apparatus determines the handshake greeting audio information based, at least in part, on the audio information and the determination that the user of the apparatus has performed the action that is consistent with the handshake greeting. In such an example embodiment, the determination of the handshake greeting audio information may be based, at least in part, on a determination that a post-handshake greeting duration has elapsed. For example, the apparatus may determine the handshake greeting audio information to include a portion of the stream of audio information that corresponds with audio information received prior to the determination that the post-handshake greeting duration has elapsed, to exclude a portion of the stream of audio information that corresponds with audio information received subsequent to the determination that the post-handshake greeting duration has elapsed, and/or the like.

In order to facilitate the receipt of and/or storage of audio information that may be relevant to a user of the apparatus, it may be desirable to determine a handshake greeting audio information start and/or a handshake greeting audio information stop such that the handshake greeting audio information start and/or the handshake greeting audio information stop at least partially bound the handshake greeting audio information within the stream of audio information. For example, the handshake greeting audio information may be identified within the stream of audio information based, at least in part, on the handshake greeting audio information start, the handshake greeting audio information stop, and/or the like. In at least one example embodiment, the determination of the handshake greeting audio information comprises determination of a handshake greeting audio information start based, at least in part, on the determination that the user of the apparatus has performed the action that is consistent with the handshake greeting. In such an example embodiment, the determination of the handshake greeting audio information may comprise determination of the handshake greeting audio information to include a portion of the stream of audio information that corresponds with audio information received subsequent to the handshake greeting audio information start, to exclude a portion of the stream of audio information that corresponds with audio information received prior to the handshake greeting audio information start, and/or the like. The handshake greeting audio information start may correspond with the determination that the user of the apparatus has performed the action that is consistent with the handshake greeting. For example, the handshake greeting audio information start may correspond with the determination that the user of the apparatus has performed the action that is consistent with a preparation portion of the handshake greeting, a contact portion of the handshake greeting, a release portion of the handshake greeting, and/or the like. In at least one example embodiment, handshake greeting audio information is at least partially bound by a handshake greeting audio information stop. The handshake greeting audio information stop may, for example, correspond with elapsing of a post-handshake greeting duration, termination of receipt of a stream of audio information from a microphone, and/or the like.

As discussed previously, in many circumstances, it may be desirable to cause storage of audio information that may have been received prior to determination that the user of the apparatus has performed the action that is consistent with at least a part of a handshake greeting. For example, a verbal introduction may precede the handshake greeting. In such an example, the user of the apparatus may desire that the handshake greeting audio information comprises the audio information that may have been received prior to determination that the user of the apparatus has performed the action that is consistent with at least a part of a handshake greeting, a preparation portion of the handshake greeting, and/or the like. In at least one example embodiment, the handshake greeting audio information start corresponds with a pre-handshake greeting duration prior to the determination that the user of the apparatus has performed the action that is consistent with the handshake greeting. The pre-handshake greeting duration may be a predetermined duration prior to a determination that a user of an apparatus has performed an action that is consistent with at least part of a handshake greeting, during which time a verbal introduction is likely to be made.

Figure 5D:
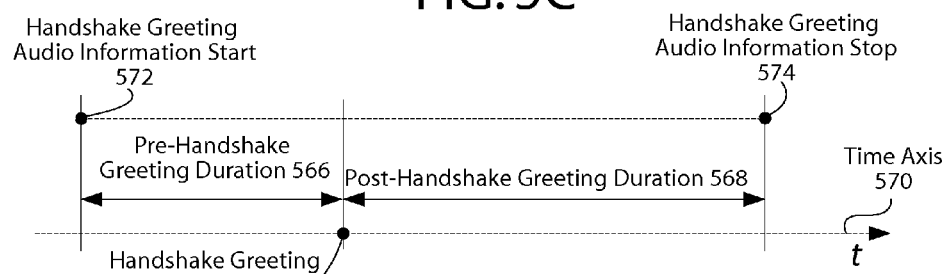

FIG. 5D is a diagram illustrating handshake greeting audio information according to at least one example embodiment. The example of FIG. 5D illustrates handshake greeting 562, pre-handshake greeting duration 566, post-handshake greeting duration 568, handshake greeting audio information start 572, and handshake greeting audio information stop 574 in relation to time axis 570. Handshake greeting 562 may be a handshake greeting, at least a part of a handshake greeting, a preparative portion of a handshake greeting, a contact portion of a handshake greeting, a release portion of a handshake greeting, and/or the like. In the example of FIG. 5D, handshake greeting audio information start 572 corresponds with a time associated with pre-handshake greeting duration 566 prior to a time associated with the determination of handshake greeting 562. For example, the portion of the stream of audio information that corresponds with pre-handshake greeting duration 566 may have been stored in a buffer. In such an example embodiment, the apparatus may have determined the handshake greeting audio information based, at least in part, on at least a portion of the audio information caused to be stored in the buffer. As such, the handshake greeting audio information corresponds with the duration between handshake greeting audio information start 572 and handshake greeting audio information stop 574. In this manner, the handshake greeting audio information corresponds with pre-handshake greeting duration 566, and post-handshake greeting duration 568. As such, handshake greeting audio information stop 574 corresponds with the elapsing of post-handshake greeting duration 568 subsequent to a time associated with the determination of handshake greeting 562. In this manner, the handshake greeting audio information comprises audio information received both prior to a time associated with the determination of handshake greeting 562 and subsequent to the time associated with the determination of handshake greeting 562.

In some circumstances, it may be desirable base the determination that a user of an apparatus has performed an action consistent with at least part of a handshake greeting, at least in part, on situational context associated with the handshake greeting. In such circumstances, the situational context may be relevant and may affect when audio signal is recorded. Situational context may be associated with a geographical location of the user, a point of interest associated with the location, an event that the user may be attending, a time of day, and/or the like. For example, in some circumstances, situational context may be conducive to a user of an apparatus meeting many individuals, performing many handshake greetings, and/or the like. In such circumstances, it may be desirable to ensure that handshake greeting audio information is captured based, at least in part, on the performance of each handshake greeting performed by the user. As such, it may be desirable to receive a stream of audio information on a continual basis based, at least in part, on the situational context.

In some circumstances, a user may desire the user's electronic apparatus to be configured such that the electronic apparatus may determine, identify, store, etc. one or more characteristics of a handshake greeting. For example, a duration of the handshake greeting may signify an importance of the individual with whom the user was performing the handshake greeting. In another example, an intensity of the handshake greeting may allude to an eagerness to make the introduction, a mood of the user, a mood of the individual with whom the user performed the handshake greeting, and/or the like. In at least one example embodiment, an apparatus determines at least one characteristic associated with a handshake greeting. The characteristic of the handshake greeting may be a duration, an intensity, a firmness, and/or the like. Such characteristics may be caused to be stored such that the characteristics are associated with the handshake greeting, the handshake greeting audio information, and/or the like. For example, duration may be represented in a unit of time, and an intensity may be represented by a normalized scale of one to ten.

In many circumstances, the user of the apparatus may desire to review handshake greeting audio information at a later point in time in order to facilitate remembrance of individuals to whom the user was introduced to, to whom the user spoke to, and/or the like. As such, it may be desirable to cause storage of the handshake greeting audio information in a manner that allows for subsequent playback, subsequent review, and/or the like. In at least one example embodiment, an apparatus causes storage of the handshake greeting audio information in a repository. In at least one example embodiment, the repository is a nonvolatile memory repository. For example, the repository may be a nonvolatile memory repository configured for storage of audio information, handshake greeting audio information, and/or the like. The nonvolatile memory repository may be associated with a range of address space within nonvolatile memory, may be associate with a block of memory space within nonvolatile memory, and/or the like. In this manner, the nonvolatile nature of the repository may be desirable in order to provide persistent storage to the user such that the user many review the handshake greeting audio information at a later time.

In order to facilitate subsequent review of the handshake greeting audio information, it may be desirable to configure the apparatus such that the user of the apparatus may indicate a desire to cause playback of the handshake greeting audio information, to cause rendering of specific handshake greeting audio information, and/or the like. In at least one example embodiment, an apparatus receives information indicative of a handshake greeting audio information rendering input. In such an example embodiment, the apparatus may cause rendering of the handshake greeting audio information based, at least in part, on the handshake greeting audio information rendering input. For example, the apparatus may playback the handshake greeting audio information by way of a speaker comprised by the apparatus, may send the handshake greeting audio information to a separate apparatus such that the separate apparatus renders the handshake greeting audio information, and/or the like.

Figure 6:
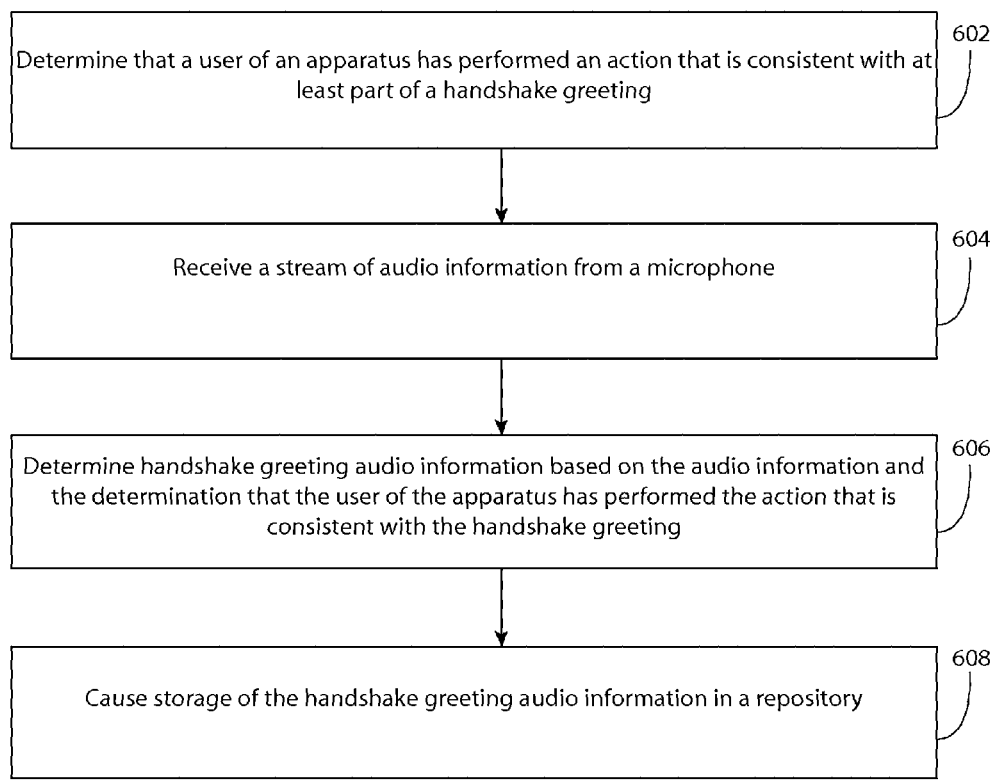
FIG. 6 is a flow diagram illustrating activities associated with causation of storage of handshake greeting audio information in a repository according to at least one example embodiment.

FIG. 6 is a flow diagram illustrating activities associated with causation of storage of handshake greeting audio information in a repository according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus determines that a user of an apparatus has performed an action that is consistent with at least part of a handshake greeting. The determination, the user, the apparatus, the action, the handshake greeting, and the part of the handshake greeting may be similar as described regarding FIGS. 2A-2B, FIG. 3, FIGS. 4A-4C, and FIGS. 5A-5D.

At block 604, the apparatus receives a stream of audio information from a microphone. The receipt, the stream of audio information, and the microphone may be similar as described regarding FIGS. 2A-2B, FIG. 3, FIGS. 4A-4C, and FIGS. 5A-5D.

At block 606, the apparatus determines handshake greeting audio information based, at least in part, on the audio information and the determination that the user of the apparatus has performed the action that is consistent with the handshake greeting. The determination and the handshake greeting audio information may be similar as described regarding FIGS. 4A-4C and FIGS. 5A-5D.

At block 608, the apparatus causes storage of the handshake greeting audio information in a repository. The causation, the storage, and the repository may be similar as described regarding FIGS. 4A-4C and FIGS. 5A-5D.

Figure 7:
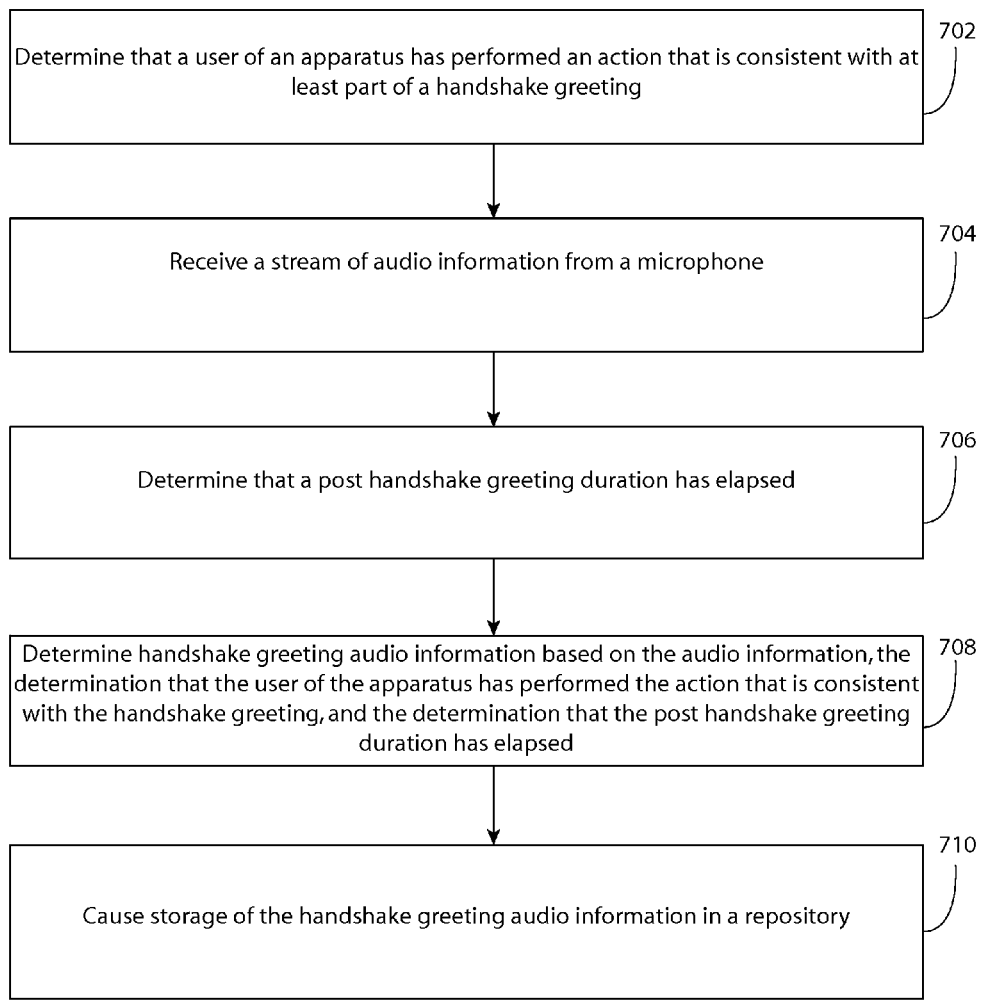
FIG. 7 is a flow diagram illustrating activities associated with causation of storage of handshake greeting audio information in a repository according to at least one example embodiment.

FIG. 7 is a flow diagram illustrating activities associated with causation of storage of handshake greeting audio information in a repository according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As described previously, in many circumstances, it may be desirable to determine handshake greeting audio information based, at least in part, on determination that a post-handshake greeting duration has elapsed.

At block 702, the apparatus determines that a user of an apparatus has performed an action that is consistent with at least part of a handshake greeting. The determination, the user, the apparatus, the action, the handshake greeting, and the part of the handshake greeting may be similar as described regarding FIGS. 2A-2B, FIG. 3, FIGS. 4A-4C, and FIGS. 5A-5D.

At block 704, the apparatus receives a stream of audio information from a microphone. The receipt, the stream of audio information, and the microphone may be similar as described regarding FIGS. 2A-2B, FIG. 3, FIGS. 4A-4C, and FIGS. 5A-5D.

At block 706, the apparatus determines that a post-handshake greeting duration has elapsed. The determination and the post-handshake greeting duration may be similar as described regarding FIGS. 4A-4C and FIGS. 5A-5D.

At block 708, the apparatus determines handshake greeting audio information based, at least in part, on the audio information, the determination that the user of the apparatus has performed the action that is consistent with the handshake greeting, and the determination that the post-handshake greeting duration has elapsed. The determination and the handshake greeting audio information may be similar as described regarding FIGS. 4A-4C and FIGS. 5A-5D.

At block 710, the apparatus causes storage of the handshake greeting audio information in a repository. The causation, the storage, and the repository may be similar as described regarding FIGS. 4A-4C and FIGS. 5A-5D.

Figure 8:
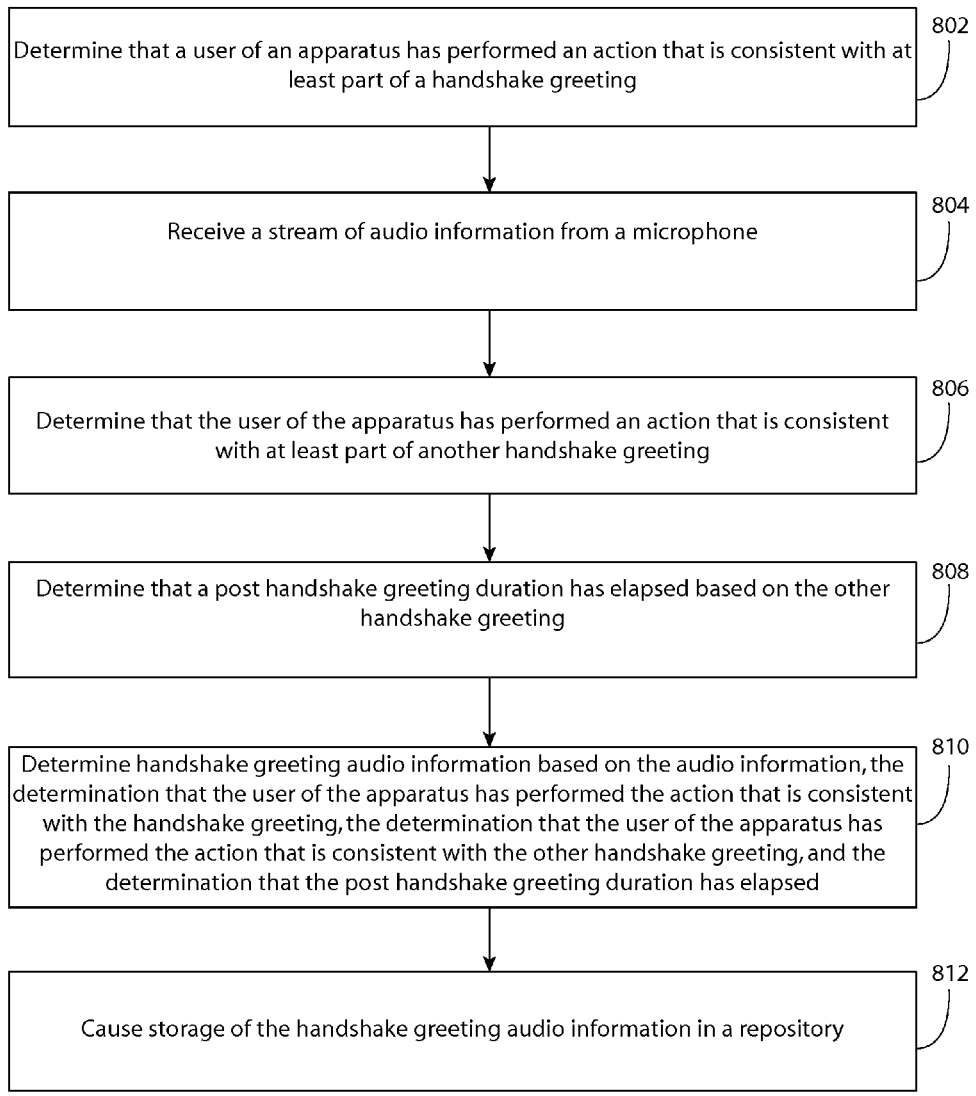
FIG. 8 is a flow diagram illustrating activities associated with causation of storage of handshake greeting audio information in a repository according to at least one example embodiment.

FIG. 8 is a flow diagram illustrating activities associated with causation of storage of handshake greeting audio information in a repository according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously discussed, in many circumstances, a user of an apparatus may perform a handshake greeting and another handshake greeting. In such circumstances, it may be desirable to determine that a post-handshake greeting duration has elapsed based, at least in part, on the handshake greeting, the other handshake greeting, and/or the like. For example, the post-handshake greeting duration may be extended based, at least in part, on the other handshake greeting.

At block 802, the apparatus determines that a user of an apparatus has performed an action that is consistent with at least part of a handshake greeting. The determination, the user, the apparatus, the action, the handshake greeting, and the part of the handshake greeting may be similar as described regarding FIGS. 2A-2B, FIG. 3, FIGS. 4A-4C, and FIGS. 5A-5D.

At block 804, the apparatus receives a stream of audio information from a microphone. The receipt, the stream of audio information, and the microphone may be similar as described regarding FIGS. 2A-2B, FIG. 3, FIGS. 4A-4C, and FIGS. 5A-5D.

At block 806, the apparatus determines that the user of the apparatus has performed an action that is consistent with at least part of another handshake greeting. The determination, the action, the other handshake greeting, and the part of the other handshake greeting may be similar as described regarding FIGS. 2A-2B, FIG. 3, FIGS. 4A-4C, and FIGS. 5A-5D.

At block 808, the apparatus determines that a post-handshake greeting duration has elapsed based, at least in part, on the other handshake greeting. The determination and the post-handshake greeting duration may be similar as described regarding FIGS. 4A-4C and FIGS. 5A-5D.

At block 810, the apparatus determines handshake greeting audio information based, at least in part, on the audio information, the determination that the user of the apparatus has performed the action that is consistent with the handshake greeting, and the determination that the post-handshake greeting duration has elapsed. The determination and the handshake greeting audio information may be similar as described regarding FIGS. 4A-4C and FIGS. 5A-5D.

At block 812, the apparatus causes storage of the handshake greeting audio information in a repository. The causation, the storage, and the repository may be similar as described regarding FIGS. 4A-4C and FIGS. 5A-5D.

Figure 9:
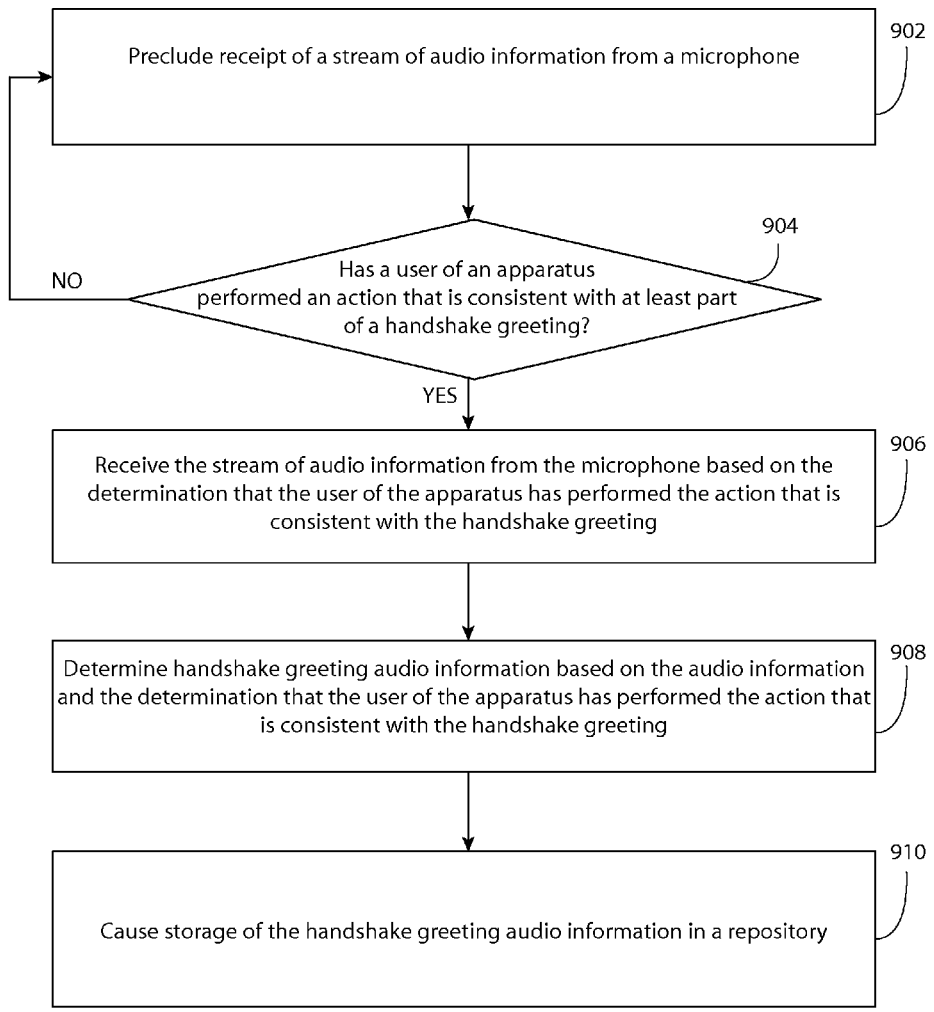
FIG. 9 is a flow diagram illustrating activities associated with causation of storage of handshake greeting audio information in a repository according to at least one example embodiment.

FIG. 9 is a flow diagram illustrating activities associated with causation of storage of handshake greeting audio information in a repository according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in many circumstances, it may be desirable to preclude receipt of a stream of audio information from a microphone prior to determination that a user of an apparatus has performed an action that is consistent with at least part of a handshake greeting.

At block 902, the apparatus precludes receipt of a stream of audio information from a microphone. In this manner, the preclusion of receipt of the stream of audio information from the microphone may be based, at least in part, on a determination that a user of an apparatus has failed to perform an action that is consistent with at least part of a handshake greeting. The preclusion, the receipt, the stream of audio information, and the microphone may be similar as described regarding FIGS. 2A-2B, FIG. 3, FIGS. 4A-4C, and FIGS. 5A-5D.

At block 904, the apparatus determines whether a user of an apparatus has performed an action that is consistent with at least part of a handshake greeting. If the apparatus determines that the user of the apparatus has performed an action that is consistent with at least part of a handshake greeting, flow proceeds to block 906. If the apparatus determines that the user of the apparatus has failed to perform an action that is consistent with at least part of a handshake greeting, flow returns to block 902. The determination, the user, the apparatus, the action, the handshake greeting, and the part of the handshake greeting may be similar as described regarding FIGS. 2A-2B, FIG. 3, FIGS. 4A-4C, and FIGS. 5A-5D.

At block 906, the apparatus receives a stream of audio information from a microphone based, at least in part, on the determination that the user of the apparatus has performed the action that is consistent with the handshake greeting. The receipt, the stream of audio information, and the microphone may be similar as described regarding FIGS. 2A-2B, FIG. 3, FIGS. 4A-4C, and FIGS. 5A-5D.

At block 908, the apparatus determines handshake greeting audio information based, at least in part, on the audio information and the determination that the user of the apparatus has performed the action that is consistent with the handshake greeting. The determination and the handshake greeting audio information may be similar as described regarding FIGS. 4A-4C and FIGS. 5A-5D.

At block 910, the apparatus causes storage of the handshake greeting audio information in a repository. The causation, the storage, and the repository may be similar as described regarding FIGS. 4A-4C and FIGS. 5A-5D.

Figure 10:
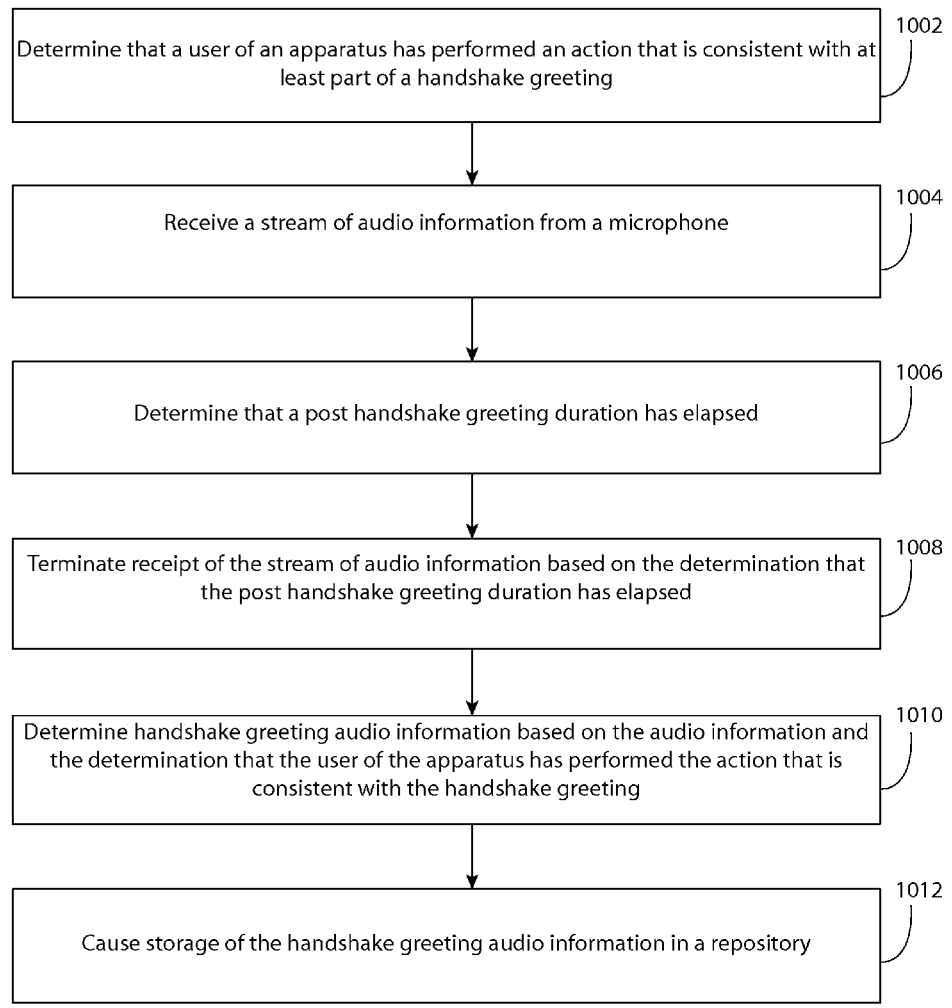
FIG. 10 is a flow diagram illustrating activities associated with causation of storage of handshake greeting audio information in a repository according to at least one example embodiment.

FIG. 10 is a flow diagram illustrating activities associated with causation of storage of handshake greeting audio information in a repository according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously discussed, in many circumstances, it may be desirable to determine that a post-handshake greeting duration has elapsed based, at least in part, on a handshake greeting. In such circumstances, it may be desirable to terminate receipt of a stream of audio information based, at least in part, on a determination that the post-handshake greeting duration has elapsed.

At block 1002, the apparatus determines that a user of an apparatus has performed an action that is consistent with at least part of a handshake greeting. The determination, the user, the apparatus, the action, the handshake greeting, and the part of the handshake greeting may be similar as described regarding FIGS. 2A-2B, FIG. 3, FIGS. 4A-4C, and FIGS. 5A-5D.

At block 1004, the apparatus receives a stream of audio information from a microphone. The receipt, the stream of audio information, and the microphone may be similar as described regarding FIGS. 2A-2B, FIG. 3, FIGS. 4A-4C, and FIGS. 5A-5D.

At block 1006, the apparatus determines that a post-handshake greeting duration has elapsed. The determination and the post-handshake greeting duration may be similar as described regarding FIGS. 4A-4C and FIGS. 5A-5D.

At block 1008, the apparatus terminates receipt of the stream of audio information based, at least in part, on the determination that the post-handshake greeting duration has elapsed. The termination of receipt may be similar as described regarding FIGS. 4A-4C and FIGS. 5A-5D.

At block 1010, the apparatus determines handshake greeting audio information based, at least in part, on the audio information and the determination that the user of the apparatus has performed the action that is consistent with the handshake greeting. The determination and the handshake greeting audio information may be similar as described regarding FIGS. 4A-4C and FIGS. 5A-5D.

At block 1012, the apparatus causes storage of the handshake greeting audio information in a repository. The causation, the storage, and the repository may be similar as described regarding FIGS. 4A-4C and FIGS. 5A-5D.

Figure 11:
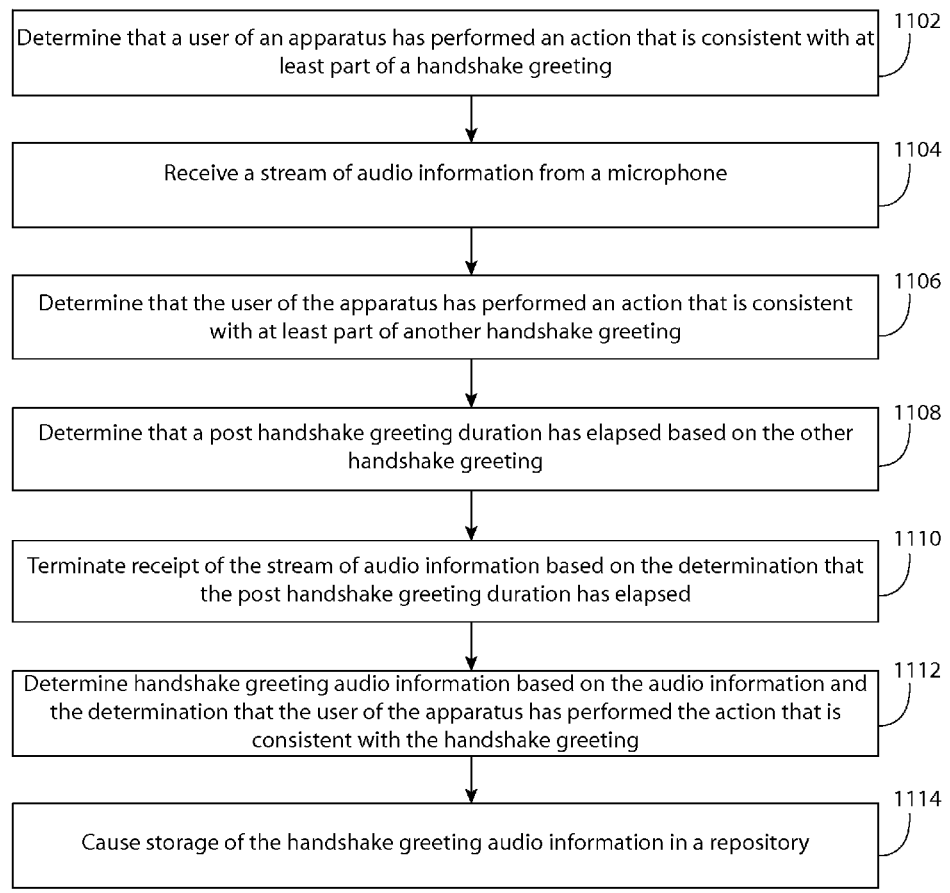
FIG. 11 is a flow diagram illustrating activities associated with causation of storage of handshake greeting audio information in a repository according to at least one example embodiment.

FIG. 11 is a flow diagram illustrating activities associated with causation of storage of handshake greeting audio information in a repository according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously discussed, in many circumstances, a user of an apparatus may perform a handshake greeting and another handshake greeting. In such circumstances, it may be desirable to determine that a post-handshake greeting duration has elapsed based, at least in part, on the handshake greeting, the other handshake greeting, and/or the like. For example, the post-handshake greeting duration may be extended based, at least in part, on the other handshake greeting. In such circumstances, it may be desirable to terminate receipt of a stream of audio information based, at least in part, on a determination that the post-handshake greeting duration has elapsed.

At block 1102, the apparatus determines that a user of an apparatus has performed an action that is consistent with at least part of a handshake greeting. The determination, the user, the apparatus, the action, the handshake greeting, and the part of the handshake greeting may be similar as described regarding FIGS. 2A-2B, FIG. 3, FIGS. 4A-4C, and FIGS. 5A-5D.

At block 1104, the apparatus receives a stream of audio information from a microphone. The receipt, the stream of audio information, and the microphone may be similar as described regarding FIGS. 2A-2B, FIG. 3, FIGS. 4A-4C, and FIGS. 5A-5D.

At block 1106, the apparatus determines that the user of the apparatus has performed an action that is consistent with at least part of another handshake greeting. The determination, the action, the other handshake greeting, and the part of the other handshake greeting may be similar as described regarding FIGS. 2A-2B, FIG. 3, FIGS. 4A-4C, and FIGS. 5A-5D.

At block 1108, the apparatus determines that a post-handshake greeting duration has elapsed based, at least in part, on the other handshake greeting. The determination and the post-handshake greeting duration may be similar as described regarding FIGS. 4A-4C and FIGS. 5A-5D.

At block 1110, the apparatus terminates receipt of the stream of audio information based, at least in part, on the determination that the post-handshake greeting duration has elapsed. The termination of receipt may be similar as described regarding FIGS. 4A-4C and FIGS. 5A-5D.

At block 1112, the apparatus determines handshake greeting audio information based, at least in part, on the audio information and the determination that the user of the apparatus has performed the action that is consistent with the handshake greeting. The determination and the handshake greeting audio information may be similar as described regarding FIGS. 4A-4C and FIGS. 5A-5D.

At block 1114, the apparatus causes storage of the handshake greeting audio information in a repository. The causation, the storage, and the repository may be similar as described regarding FIGS. 4A-4C and FIGS. 5A-5D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 602 of FIG. 6 may be performed after block 604 of FIG. 6. Furthermore, if desired, one or more of the above-described functions may be optional or may be combined. For example, block 1008 of FIG. 10 may be optional and/or combined with block 1006 of FIG. 10.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor;
at least one memory including computer program code, the memory and the computer program code configured to, working with the processor, cause the apparatus to perform at least the following:
determining that a user of the apparatus has performed an action that is consistent with at least part of a preparative portion of a handshake greeting;
receiving a stream of audio information from a microphone prior to determining that the user of the apparatus has performed the action that is consistent with the preparative portion of the handshake greeting;
determining that the user of the apparatus has performed an action that is consistent with a contact portion of the handshake greeting;
determining that the user of the apparatus has performed an action that is consistent with at least part of a release portion of the handshake greeting;
determining handshake greeting audio information based, at least in part, on the audio information and the determination that the user of the apparatus has performed the actions that are consistent with the preparative portion of the handshake greeting, the contact portion of the handshake greeting, and the release portion of the handshake greeting; and
storing the handshake greeting audio information.

2. The apparatus of claim 1, wherein determining that the user of the apparatus has performed the actions that are consistent with the handshake greeting comprises receiving sensor information and determining that the sensor information is consistent with the user of the apparatus performing the handshake greeting.

3. The apparatus of claim 2, wherein the sensor information is visual information.

4. The apparatus of claim 2, wherein the sensor information is motion information.

5. The apparatus of claim 2, wherein the sensor information is hand position information.

6. The apparatus of claim 1, wherein the memory includes computer program code configured to, working with the processor, cause the apparatus to preclude storing the stream of audio information prior to determining that the user of the apparatus has performed the actions that are consistent with the handshake greeting.

7. The apparatus of claim 1, wherein the memory includes computer program code configured to, working with the processor, cause the apparatus to perform:
determining that a post-handshake greeting duration has elapsed; and
terminating receipt of the stream of audio information based, at least in part, on determining that the post-handshake greeting duration has elapsed.

8. The apparatus of claim 7, wherein the memory includes computer program code configured to, working with the processor, cause the apparatus to perform:
determining that the user of the apparatus has performed an action that is consistent with at least part of another handshake greeting, wherein determining that the post-handshake greeting duration has elapsed is based, at least in part, on the other handshake greeting.

9. The apparatus of claim 7, wherein the memory includes computer program code configured to, working with the processor, cause the apparatus to perform:
determining that the user of the apparatus has performed an action that is consistent with a contact portion of another handshake greeting, wherein determining that the post-handshake greeting duration has elapsed is based, at least in part, on the other handshake greeting.

10. The apparatus of claim 1, wherein the memory includes computer program code configured to, working with the processor, cause the apparatus to perform:
determining that a post-handshake greeting duration has elapsed, wherein determining the handshake greeting audio information is based, at least in part, on determining that the post-handshake greeting duration has elapsed.

11. The apparatus of claim 1, wherein the apparatus comprises the microphone.

12. At least one non-transitory computer-readable medium encoded with instructions that, when executed by a processor, perform:
- determining that a user of the apparatus has performed an action that is consistent with a preparative portion of a handshake greeting;
- determining that the user of the apparatus has performed an action that is consistent with at least part of a contact portion of the handshake greeting;
- determining that the user of the apparatus has performed an action that is consistent with at least part of a release portion of the handshake greeting;
- receiving a stream of audio information from a microphone into a buffer;
- determining handshake greeting audio information based, at least in part, on the audio information and determining that the user of the apparatus has performed the actions that are consistent with the preparative portion of a handshake greeting, the contact portion of the handshake greeting, and the release portion of the handshake greeting; and
- storing the handshake greeting audio information from the buffer in a repository.

13. The medium of claim 12, wherein the storing the stream of audio information is caused, at least in part, by determining that the user of the apparatus has performed the actions that are consistent with the handshake greeting.

14. The medium of claim 13, further encoded with instructions that, when executed by a processor, perform:
- precluding storage of the stream of audio information prior to determining that the user of the apparatus has performed the actions that are consistent with the handshake greeting.

15. The medium of claim 13, further encoded with instructions that, when executed by a processor, perform:
- determining that a post-handshake greeting duration has elapsed; and
- terminating storage of the stream of audio information based, at least in part, on determining that the post-handshake greeting duration has elapsed.

16. A method comprising:
- determining that a user of the apparatus has performed an action that is consistent with a preparative portion of a handshake greeting;
- determining that the user of the apparatus has performed an action that is consistent with at least part of a contact portion of the handshake greeting;
- determining that the user of the apparatus has performed an action that is consistent with at least part of a release portion of the handshake greeting;
- receiving a stream of audio information from a microphone caused, at least in part, by determining that the user of the apparatus has performed the action that is consistent with the preparative portion of the handshake greeting;
- determining handshake greeting audio information based, at least in part, on the audio information and determining that the user of the apparatus has performed the action that is consistent with the contact portion of the handshake greeting and the action that is consistent with at least part of the release portion of the handshake greeting; and
- storing the handshake greeting audio information.

17. The method of claim 16, further comprising:
- determining that a post-handshake greeting duration has elapsed; and
- terminating receipt of the stream of audio information based, at least in part, on determining that the post-handshake greeting duration has elapsed.

18. The method of claim 17, further comprising determining that the user of the apparatus has performed an action that is consistent with at least part of another handshake greeting, wherein determining that the post-handshake greeting duration has elapsed is based, at least in part, on the other handshake greeting.

19. The method of claim 16, further comprising determining that a post-handshake greeting duration has elapsed, wherein determining the handshake greeting audio information is based, at least in part, on determining that the post-handshake greeting duration has elapsed.

20. The method of claim 16, wherein determining that the user of the apparatus has performed the actions that are consistent with the handshake greeting comprises receiving sensor information and determining that the sensor information is consistent with the user of the apparatus performing the handshake greeting.

* * * * *